(12) United States Patent
Zhang

(10) Patent No.: US 9,416,240 B2
(45) Date of Patent: Aug. 16, 2016

(54) LOW-WEAR MICROPOROUS FRICTION MATERIAL WITH HIGH STABILITY COEFFICIENT AND MANUFACTURING METHOD THEREOF

(71) Applicant: SHANGHAI REINPHEN COMPOSITE MATERIALS CO., LTD, Shanghai (CN)

(72) Inventor: Ding Quan Zhang, Shanghai (CN)

(73) Assignee: SHANGHAI REINPHEN COMPOSITE MATERIALS CO., LTD, Shanghai (CN)

( * ) Notice: Subject to any disclaimer, the term of this patent is extended or adjusted under 35 U.S.C. 154(b) by 0 days.

(21) Appl. No.: 14/425,221

(22) PCT Filed: Oct. 11, 2012

(86) PCT No.: PCT/CN2012/082790
§ 371 (c)(1),
(2) Date: Mar. 2, 2015

(87) PCT Pub. No.: WO2014/032360
PCT Pub. Date: Mar. 6, 2014

(65) Prior Publication Data
US 2015/0218333 A1 Aug. 6, 2015

(30) Foreign Application Priority Data

Aug. 30, 2012 (CN) .......................... 2012 1 0316276

(51) Int. Cl.
| | |
|---|---|
| *C08J 9/00* | (2006.01) |
| *C08J 9/02* | (2006.01) |
| *C08K 3/04* | (2006.01) |
| *C08K 3/30* | (2006.01) |
| *C08K 3/20* | (2006.01) |
| *C08K 3/34* | (2006.01) |
| *C08K 5/20* | (2006.01) |
| *F16D 69/02* | (2006.01) |
| *C08J 9/232* | (2006.01) |
| *C08L 73/00* | (2006.01) |
| *C08J 9/10* | (2006.01) |

(52) U.S. Cl.
CPC .............. *C08J 9/0061* (2013.01); *C08J 9/0052* (2013.01); *C08J 9/0085* (2013.01); *C08J 9/102* (2013.01); *C08J 9/107* (2013.01); *C08J 9/232* (2013.01); *C08L 73/00* (2013.01); *F16D 69/023* (2013.01); *F16D 69/026* (2013.01); *C08J 9/0095* (2013.01); *C08J 2205/044* (2013.01); *C08J 2361/14* (2013.01); *C08J 2373/00* (2013.01); *C08J 2409/02* (2013.01); *C08J 2419/00* (2013.01); *C08J 2427/18* (2013.01); *C08J 2477/06* (2013.01); *C08J 2477/10* (2013.01); *C08J 2483/04* (2013.01); *C08L 2205/03* (2013.01); *C08L 2205/06* (2013.01)

(58) Field of Classification Search
None
See application file for complete search history.

(56) References Cited

U.S. PATENT DOCUMENTS

| | | | | |
|---|---|---|---|---|
| 6,025,405 A | * | 2/2000 | Snell Tung | ............ C08J 9/0061 521/138 |
| 2004/0206441 A1 | | 10/2004 | Lamport | |

FOREIGN PATENT DOCUMENTS

| | | |
|---|---|---|
| CN | 1944498 | 4/2007 |
| CN | 101024760 | 8/2007 |

* cited by examiner

*Primary Examiner* — Kara Boyle
(74) *Attorney, Agent, or Firm* — Hamre, Schumann, Mueller & Larson, P.C.

(57) ABSTRACT

A low-wear microporous friction material with a high stability coefficient and a manufacturing method thereof are provided. The formula of the friction material includes GM-15 resin 15-50 wt %, rubber 0-10 wt %, shaping aid 0.5-5 wt %, sintering aid 0.5-5 wt %, foaming aid 0.5-5 wt %, kaolin powder 0.5-20 wt %, barite powder 5-40 wt %, carbon fiber 2-20 wt %, KEVLAR 1-5 wt %, zinc oxide 1-10 wt %, and iron oxide red 0-2 wt %. By adjusting the hydrophilicity of the friction material and controlling the surface tension of the material, the friction coefficient of the material is kept from lowering under wet conditions and is rendered stable in dry and wet conditions. More specifically, the friction coefficient of the friction material stays above 0.25 under wet conditions, and the stability coefficient of the friction coefficient can reach 85% or above on an MM 1000 tester.

8 Claims, No Drawings

LOW-WEAR MICROPOROUS FRICTION MATERIAL WITH HIGH STABILITY COEFFICIENT AND MANUFACTURING METHOD THEREOF

BACKGROUND OF THE INVENTION

1. Technical Field

The present invention relates to a friction material and, more particularly, to a low-wear microporous friction material with a high stability coefficient and a manufacturing method thereof.

2. Description of Related Art

Since their advent, microporous materials have been effective to some extent in lowering the friction temperature of friction pairs. In actual use, however, microporous materials have certain drawbacks such as uneven pore sizes, inconsistent wear resistance between batches, and an instable friction coefficient under wet conditions. The present invention not only can lower the brake temperature to protect the mating materials from thermal damage attributable to an excessively high brake temperature, but also can control the pore size of the material disclosed herein, reduce the wear rate of the material, and thereby extend the material's service life. The present invention also ensures that the friction coefficient of the material is not reduced under wet conditions. Thus, the present invention provides an effective way to deal with high-speed, heavy-load, and frequent braking.

BRIEF SUMMARY OF THE INVENTION

One objective of the present invention is to overcome the above-mentioned defects of the prior art and provide a low-wear microporous friction material with a high stability coefficient and a manufacturing method thereof.

This objective of the present invention can be achieved through the following technical solutions: A low-wear microporous friction material with a high stability coefficient is characterized in that the formula of the material is as follows:

| Constituents | Percentage by weight |
| --- | --- |
| GM-15 resin | 15-50 |
| rubber | 0-10 |
| shaping aid | 0.5-5 |
| sintering aid | 0.5-5 |
| foaming aid | 0.5-5 |
| kaolin powder | 0.5-20 |
| barite powder | 5-40 |
| carbon fiber | 2-20 |
| KEVLAR | 1-5 |
| zinc oxide | 1-10 |
| iron oxide red | 0-2. |

It is preferable that the formula of the material is as follows:

| Constituents | Percentage by weight |
| --- | --- |
| GM-15 resin | 22-35 |
| rubber | 5-8 |
| shaping aid | 1-3 |
| sintering aid | 1-4 |
| foaming aid | 2-3 |
| kaolin powder | 10-15 |
| barite powder | 15-35 |
| carbon fiber | 10-15 |
| KEVLAR | 2-4 |
| zinc oxide | 2-7 |
| iron oxide red | 1-2. |

The GM-15 resin is a commercially available modified phenolic resin.

The rubber is a nitrile powder rubber.

The shaping aid includes but is not limited to 4-t-butyl thiophenol zinc, zinc pentachlorothiophenol, or an acrylate copolymer.

The sintering aid includes but is not limited to an organic silicone resin, dimethicone, or polytetrafluoroethylene.

The foaming aid includes but is not limited to azodicarbonamide, N,N-dinitroso pentamethylenetetramine, or azobisisobutyronitrile.

The carbon fiber is commercially available chopped carbon fiber.

The KEVLAR is commercially available aramid pulp.

A manufacturing method of a low-wear microporous friction material with a high stability coefficient is characterized in that the method comprises the following steps:

(1) weighing the raw materials (i.e., the constituents):

| Constituents | Percentage by weight |
| --- | --- |
| GM-15 resin | 15-50 |
| rubber | 0-10 |
| 4-t-butyl thiophenol zinc | 0.5-5 |
| sintering aid | 0.5-5 |
| foaming aid | 0.5-5 |
| kaolin powder | 0.5-20 |
| barite powder | 5-40 |
| carbon fiber | 2-20 |
| KEVLAR | 1-5 |
| zinc oxide | 1-10 |
| iron oxide red | 0-2; | and (2) adding the above constituents into a high-speed rake mixer and mixing the constituents, wherein the mixing time is 2~50 min; reacting the mixed material in a shaping mold at room temperature ~120° C. and under a pressure of 200~500 kg/cm² for 20~300 sec; and then sintering the shaped friction sheet at high temperature, wherein the sintering temperature is 160-260° C., and the sintering time is 2-20 hours. Thus, a microporous friction material is obtained. The reaction pressure in the shaping mold is preferably 250~300 kg/cm², the reaction time is preferably 100~200 sec, the sintering temperature is preferably 180-220° C., and the sintering time is preferably 10~12 hours.

Typically, a microporous friction material produced by a prior art technique has micropore sizes of 1-4 μm, a porosity of 5%-20%, and an average wear rate of 0.35 cm³/MJ. When subjected to a wet condition in a bench test, with μaverage<0.20, the stability coefficient of the friction coefficient of such a material is less than 80% on an MM1000 tester.

Compared with the existing microporous friction materials, the present invention achieves the following: by adjusting the hydrophilicity of the friction material disclosed herein and controlling the surface tension of the material, the friction coefficient of the material is kept from lowering under wet conditions and is rendered stable in dry and wet conditions. In the prior art, by contrast, the friction coefficient of a friction material decreases rapidly to below 0.2 in wet conditions. By employing the technique of the present invention, the friction coefficient of the disclosed friction material is kept above 0.25 under wet conditions, and the stability coefficient of the friction coefficient can reach 85% or above on an MM1000 tester.

Compared with the prior art, the present invention also achieves the following: by adding the foaming aid, the pore size of the microporous material disclosed herein is controlled at 0.5-1 μm. Since abrasive particles contributing to friction are typically greater than 2 μm in diameter (60%), these abrasive particles will not clog the micropores and can be easily discharged, thereby reducing the probability of abrasive wear and avoiding the generation of metal inlays.

In addition, according to the present invention, the pore sizes and porosity of the microporous material are respectively controlled at 0.2-1 μm and 15%-35% or above by changing the shaping temperature and the shaping pressure and by adding the shaping aid. With this technique, the wear to which the product is subject is greatly reduced, with an average wear rate lower than 0.16 cm$^3$/MJ, and the service life of the product is thus doubled at least. In short, the friction material disclosed herein is a green low-carbon friction material.

DETAILED DESCRIPTION OF THE INVENTION

The present invention will be described in detail below with reference to specific embodiments.

Embodiment 1

(1) Formulation of the Constituents:

| Constituents | Percentage by weight |
| --- | --- |
| GM-15 resin | 22 |
| nitrile powder rubber | 5 |
| 4-t-butyl thiophenol zinc | 3 |
| organic silicone resin | 1 |
| foaming agent AC (azodicarbonamide) | 2 |
| kaolin powder | 15 |
| barite powder | 35 |
| carbon fiber | 7 |
| KEVLAR | 2 |
| zinc oxide | 7 |
| iron oxide red | 1 |

(2) Preparation:

The above constituents were added stepwise into a high-speed rake mixer in proportion and mixed, wherein the mixing time was 25 min. Then, the mixed material was reacted in a shaping mold at 80° C. and under a pressure of 250 kg/cm$^2$ for 150 sec. After that, the shaped friction sheet was sintered at high temperature, wherein the sintering temperature was 200° C. and the sintering time was 10 hours. Consequently, a microporous friction material was obtained.

The properties of the obtained friction material are as follows:

1. Physical and Mechanical Properties

| Test item | Test result |
| --- | --- |
| porosity | 27% |
| pore size | 0.5-1 μm |
| density | 1.48 g/cm$^3$ |

2. Friction Properties

| Test item | Test result |
| --- | --- |
| Average friction coefficient (80 km/h) | 0.303 |
| Stability coefficient of the friction coefficient | 88.08% |
| Average friction coefficient in a wet condition | 0.287 |
| Average wear rate | 0.11 cm$^3$/MJ |

Embodiment 2

(1) Formulation of the Constituents:

| Constituents | Percentage by weight |
| --- | --- |
| GM-15 resin | 35 |
| nitrile powder rubber | 0 |
| zinc pentachlorothiophenol | 1 |
| dimethicone | 1.5 |
| foaming agent DPT (N,N-dinitroso pentamethylenetetramine) | 2.5 |
| kaolin powder | 10 |
| barite powder | 29 |
| carbon fiber | 15 |
| KEVLAR | 1 |
| zinc oxide | 5 |
| iron oxide red | 0 |

(2) Preparation:

The above constituents were added stepwise into a high-speed rake mixer in proportion and mixed, wherein the mixing time was 30 min. Then, the mixed material was reacted in a shaping mold at 100° C. and under a pressure of 200 kg/cm$^2$ for 200 sec. After that, the shaped friction sheet was sintered at high temperature, wherein the sintering temperature was 220° C. and the sintering time was 12 hours. Consequently, a microporous friction material was obtained.

The properties of the obtained material are as follows:

1. Physical and Mechanical Properties

| Test item | Test result |
| --- | --- |
| porosity | 30% |
| pore size | 0.3-0.8 μm |
| density | 1.42 g/cm$^3$ |

2. Friction Properties

| Test item | Test result |
| --- | --- |
| Average friction coefficient (80 km/h) | 0.305 |
| Stability coefficient of the friction coefficient | 88.35% |
| Average friction coefficient in a wet condition | 0.284 |
| Average wear rate | 0.09 cm$^3$/MJ |

Embodiment 3
(1) Formulation of the Constituents:

| Constituents | Percentage by weight |
|---|---|
| GM-15 resin | 15 |
| nitrile powder rubber | 10 |
| acrylate copolymer | 5 |
| polytetrafluoroethylene | 4 |
| foaming agent AIBN (azobisisobutyronitrile) | 5 |
| kaolin powder | 20 |
| barite powder | 15 |
| carbon fiber | 10 |
| KEVLAR | 4 |
| zinc oxide | 10 |
| iron oxide red | 2 |

(2) Preparation:

The above constituents were added stepwise into a high-speed rake mixer in proportion and mixed, wherein the mixing time was 30 min. Then, the mixed material was reacted in a shaping mold at 50° C. and under a pressure of 300 kg/cm² for 100 sec. After that, the shaped friction sheet was sintered at high temperature, wherein the sintering temperature was 180° C. and the sintering time was 20 hours. Consequently, a macroporous friction material was obtained.

The properties of the obtained material are as follows:

1. Physical and Mechanical Properties

| Test item | Test result |
|---|---|
| porosity | 29% |
| pore size | 0.55-1.0 μm |
| density | 1.46 g/cm³ |

2. Friction Properties

| Test item | Test result |
|---|---|
| Average friction coefficient | 0.317 |
| Stability coefficient of the friction coefficient | 85.19% |
| Average friction coefficient in a wet condition | 0.292 |
| Average wear rate | 0.12 cm³/MJ |

Embodiment 4
(1) Formulation of the Constituents:

| Constituents | Percentage by weight |
|---|---|
| GM-15 resin | 50 |
| nitrile powder rubber | 0 |
| acrylate copolymer | 0.5 |
| polytetrafluoroethylene | 0.5 |
| foaming agent AIBN (azobisisobutyronitrile) | 0.5 |
| kaolin powder | 0.5 |
| barite powder | 40 |
| carbon fiber | 2 |
| KEVLAR | 5 |
| zinc oxide | 1 |
| iron oxide red | 0 |

(2) Preparation:

The above constituents were added stepwise into a high-speed rake mixer in proportion and mixed, wherein the mixing time was 2 min. Then, the mixed material was reacted in a shaping mold at 120° C. and under a pressure of 200 kg/cm² for 300 sec. After that, the shaped friction sheet was sintered at high temperature, wherein the sintering temperature was 260° C. and the sintering time was 2 hours. Consequently, a microporous friction material was obtained.

The properties of the obtained material are as follows:

1. Physical and Mechanical Properties

| Test item | Test result |
|---|---|
| porosity | 27% |
| pore size | 0.5-0.8 μm |
| density | 1.49 g/cm³ |

2. Friction Properties

| Test item | Test result |
|---|---|
| Average friction coefficient (80 km/h) | 0.32 |
| Stability coefficient of the friction coefficient | 87.45% |
| Average friction coefficient in a wet condition | 0.295 |
| Average wear rate | 0.08 cm³/MJ |

Embodiment 5
(1) Formulation of the Constituents:

| Constituents | Percentage by weight |
|---|---|
| GM-15 resin | 40 |
| nitrile powder rubber | 8 |
| zinc pentachlorothiophenol | 3 |
| dimethicone | 5 |
| foaming agent DPT (N,N-dinitroso pentamethylenetetramine) | 3 |
| kaolin powder | 10 |
| barite powder | 5 |
| carbon fiber | 20 |
| KEVLAR | 3 |
| zinc oxide | 2 |
| iron oxide red | 1 |

(2) Preparation:

The above constituents were added stepwise into a high-speed rake mixer in proportion and mixed, wherein the mixing time was 50 min. Then, the mixed material was reacted in a shaping mold at room temperature and under a pressure of 500 kg/cm² for 20 sec. After that, the shaped friction sheet was sintered at high temperature, wherein the sintering temperature was 160° C. and the sintering time was 20 hours. Consequently, a microporous friction material was obtained.

The properties of the obtained material are as follows:

1. Physical and Mechanical Properties

| Test item | Test result |
|---|---|
| porosity | 20% |
| pore size | 0.4-0.9 μm |
| density | 1.46 g/cm³ |

2. Friction Properties

| Test item | Test result |
|---|---|
| Average friction coefficient | 0.308 |
| Stability coefficient of the friction coefficient | 86.77% |
| Average friction coefficient in a wet condition | 0.285 |
| Average wear rate | 0.10 cm$^3$/MJ |

What is claimed is:

1. A microporous friction material comprising:

| Constituents | Percentage by weight |
|---|---|
| phenolic resin | 15-50 |
| rubber | 0-10 |
| shaping aid | 0.5-5 |
| sintering aid | 0.5-5 |
| foaming aid | 0.5-5 |
| kaolin powder | 0.5-20 |
| barite powder | 5-40 |
| carbon fiber | 2-20 |
| aramid pulp | 1-5 |
| zinc oxide | 1-10 |
| iron oxide red | 0-2. |

2. The microporous friction material according to claim 1, comprising:

| Constituents | Percentage by weight |
|---|---|
| phenolic resin | 22-35 |
| rubber | 5-8 |
| shaping aid | 1-3 |
| sintering aid | 1-4 |
| foaming aid | 2-3 |
| kaolin powder | 10-15 |
| barite powder | 15-35 |
| carbon fiber | 10-15 |
| aramid pulp | 2-4 |
| zinc oxide | 2-7 |
| iron oxide red | 1-2. |

3. The microporous friction material according to claim 1, wherein the rubber is a nitrile powder rubber.

4. The microporous friction material according to claim 1, wherein the shaping aid includes but not limited to 4-t-butyl thiophenol zinc, zinc pentachlorothiophenol, or an acrylate copolymer.

5. The microporous friction material according to claim 1, wherein that the sintering aid includes but not limited to an organic silicone resin, dimethicone, or polytetrafluoroethylene.

6. The microporous friction material according to claim 1, wherein the foaming aid includes but not limited to azodicarbonamide, N,N-dinitroso pentamethylenetetramine, or azobisisobutyronitrile.

7. The microporous friction material according to claim 1, wherein the carbon fiber is chopped carbon fiber.

8. A manufacturing method of the microporous friction material according to claim 1, comprising:

(1) weighing constituents:

| Constituents | Percentage by weight |
|---|---|
| phenolic resin | 15-50 |
| rubber | 0-10 |
| 4-t-butyl thiophenol zinc | 0.5-5 |
| sintering aid | 0.5-5 |
| foaming aid | 0.5-5 |
| kaolin powder | 0.5-20 |
| barite powder | 5-40 |
| carbon fiber | 2-20 |
| aramid pulp | 1-5 |
| zinc oxide | 1-10 |
| iron oxide red | 0-2; |

(2) adding the constituents into a high-speed rake mixer and mixing the constituents to obtain a mixed material, wherein the mixing time is 2-50 min;

(3) reacting the mixed material in a shaping mold at a temperature in a range from room temperature to 120° C. and under a pressure of 200-500 kg/cm$^2$ for 20-300 sec; and (4) sintering a resultant shaped friction sheet at a temperature of 160-260° C. for 2-20 hours to obtain the microporous friction material.

* * * * *